April 13, 1943. R. SCHENBECK 2,316,290
COAL CHUTE CARRIER
Filed Nov. 28, 1940
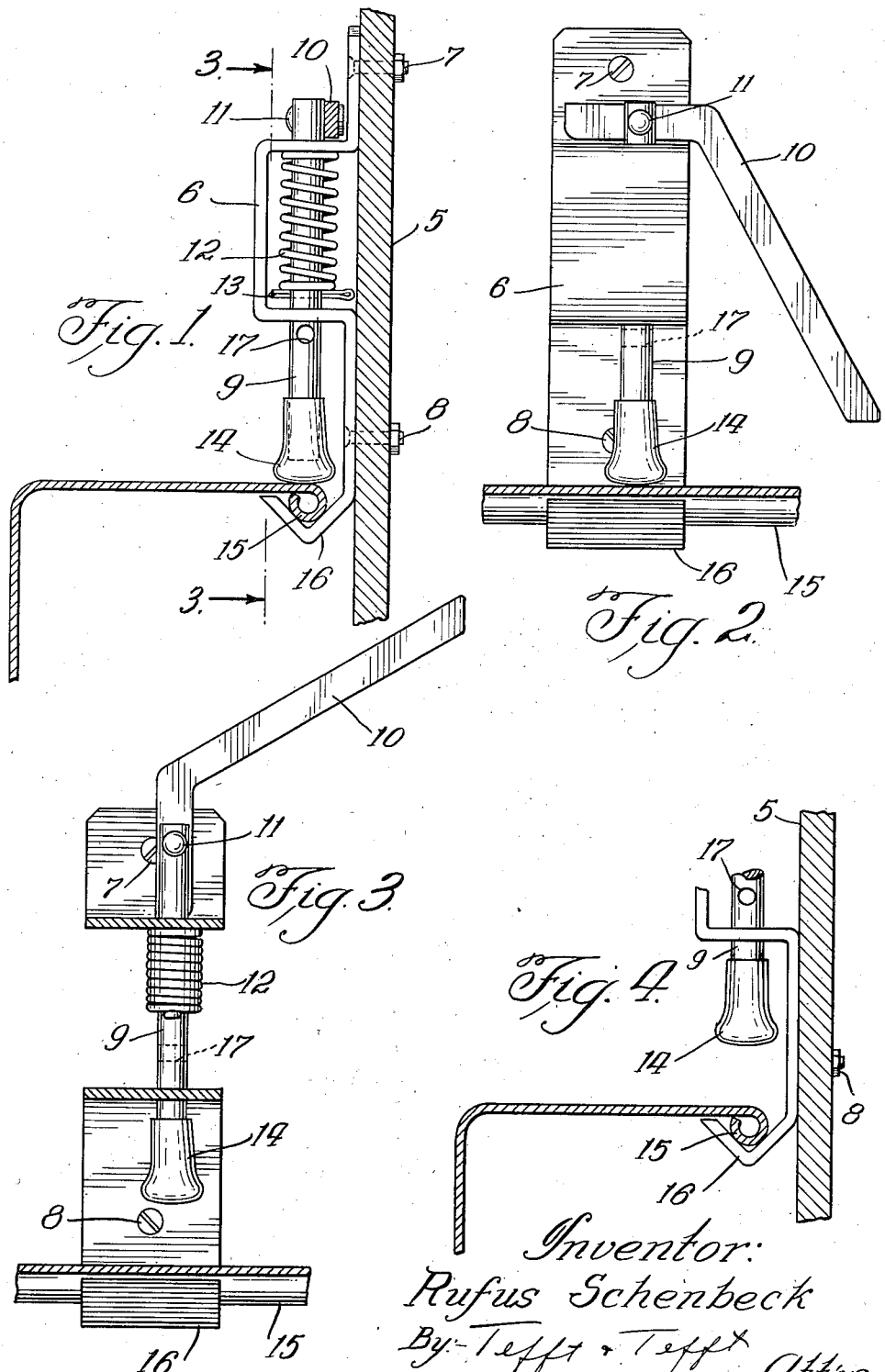
Inventor:
Rufus Schenbeck
By Tefft + Tefft Attys.

Patented Apr. 13, 1943

2,316,290

UNITED STATES PATENT OFFICE 2,316,290

COAL CHUTE CARRIER

Rufus Schenbeck, Toledo, Ohio

Application November 28, 1940, Serial No. 367,507

1 Claim. (Cl. 224—29)

This invention relates to material handling trucks such as coal trucks, and more particularly to a device for detachably securing a chute or the like to the truck body. The present invention is an improvement of my chute carrier described and claimed in my Patent No. 2,169,453, issued August 15, 1939, and reference is directed to this patent for its detailed disclosures.

The particular object of this invention is to provide quick action, spring actuated support brackets that will firmly and securely hold the chute in position on the truck body, and to thereby reduce rattles and noises during transportation, and to facilitate mounting and dismounting of the chute.

Another object is to provide means to lock the chute in the brackets to prevent theft.

Other objects and benefits will be disclosed in the following descriptions and drawing in which:

Fig. 1 is a broken sectional end elevation view showing a preferred embodiment of my quick-action chute bracket with the chute clamped in position against the side of the truck.

Fig. 2 is a front elevation view of the bracket shown in Fig. 1.

Fig. 3 is a front elevation view of the bracket as it appears on the section lines 3—3 of Fig. 1 with the clamp in open position.

Fig. 4 is a broken end elevation view of the clamp as shown in Fig. 3.

Now referring to the drawing I designate the side of the truck by the numeral 5, and affixed to the truck side by the bolts 7 and 8 is a bracket 6; a plunger 9 is slidably mounted in the bracket 6 and this plunger 9 is liftable by the handle cam 10 pivoted in position at the upper end of 9 by the rivet 11. Mounted in the opening of the bracket 6 is a compression spring 12 which normally forces the plunger 9 downward by its engagement with the cotter pin 13. On the bottom of the plunger 9 is a bumper 14 which engages the chute flange 15 and forces it into retaining notch 16 integral with the bracket 6.

It will readily be appreciated that by this structure the chute 15 is firmly held in the bracket 16 when the quick-action cam lever is in the position as shown in Figs. 1 and 2. However, when the lever 10 is raised as shown in Figs. 3 and 4, the chute may be readily removed from the brackets. It will be understood that I intend to use a plurality of such brackets as clearly shown in my Patent No. 2,169,453, issued August 15, 1939.

In the illustrations I show an inturned flange 15 on the chute. However, it will be appreciated that for chutes with outwardly turned projections a mating notch may be made in the bumper 14 which will retain the chute in position exactly as shown for inwardly turned projections on the flanges. In this connection I would prefer to make the bumpers 14 of metal and fashion the bumper to fit any desired form of projection. In the preferred embodiment, as shown in the illustrations, I would prefer to make the bumpers 14 of molded rubber and thereby further reduce rattles and noises incident to transporting the chutes on trucks.

I show a hole 17 through the plunger 9 and I provide this hole as a means to attach any conventional type of lock. With a lock in the opening 17, it will be appreciated that the plunger 9 cannot be lifted and, therefore, the chute is locked and held on the truck body.

From the foregoing description it will be appreciated that I have provided in the present form of support bracket structure an arrangement whereby the chutes are firmly held in position with the spring actuated plunger and thereby rattles and noises incident to transportation are largely eliminated. It will further be appreciated that by raising the cam handles 10 the plungers are conveniently and instantly withdrawn and the chute may be readily removed. Further, with the plunger in locked position on the chutes, I have effectively guarded against theft of chutes when the truck is left unattended.

Having thus described my invention, I claim as new:

A carrier for a channel chute having a projection on the edge of its side flange, comprising a member formed of a single strip of material having a body portion adapted to be affixed to a vehicle body, said body portion having spaced outwardly projecting brackets thereon, one of said brackets having a retaining notch in a side thereof to engage a projection on the chute flange, a spring-actuated plunger slidably mounted in another of said brackets to hold the chute flange in engagement with the first-mentioned bracket, and a quick-action cam lever pivoted to the plunger to lift the plunger from engagement with the chute to permit withdrawal of the chute from the bracket, said cam lever comprising an elongated bar having an integral offset end portion, said end portion having a flat end at right angles to the length thereof in position to rest directly on the bracket and hold the plunger retracted.

RUFUS SCHENBECK.